United States Patent
Bawa et al.

(10) Patent No.: US 12,456,922 B2
(45) Date of Patent: Oct. 28, 2025

(54) IMPLEMENTING A BUCK CONVERTER SUPPORTING AUTOMATIC CONTINUOUS CONDUCTION MODE AND DISCONTINUOUS CONDUCTION MODE

(71) Applicant: Rambus Inc., San Jose, CA (US)

(72) Inventors: Gaurav Bawa, Austin, TX (US); Panduka Wijetunga, Thousand Oaks, CA (US); Mo Zhang, Sunnyvale, CA (US)

(73) Assignee: Rambus Inc., San Jose, CA (US)

(*) Notice: Subject to any disclaimer, the term of this patent is extended or adjusted under 35 U.S.C. 154(b) by 211 days.

(21) Appl. No.: 17/989,048

(22) Filed: Nov. 17, 2022

(65) Prior Publication Data

US 2023/0198405 A1 Jun. 22, 2023

Related U.S. Application Data

(60) Provisional application No. 63/292,195, filed on Dec. 21, 2021.

(51) Int. Cl.
*H02M 3/158* (2006.01)
*H02M 1/00* (2006.01)

(52) U.S. Cl.
CPC ......... *H02M 3/158* (2013.01); *H02M 1/0025* (2021.05); *H02M 1/0048* (2021.05)

(58) Field of Classification Search
CPC .......................................... H02M 3/155–1588
See application file for complete search history.

(56) References Cited

U.S. PATENT DOCUMENTS

| | | | | |
|---|---|---|---|---|
| 5,690,693 A | * | 11/1997 | Wang | A61N 1/3787 607/61 |
| 9,647,558 B2 | | 5/2017 | Houston et al. | |
| 10,110,122 B2 | | 10/2018 | Bari et al. | |
| 2012/0038331 A1 | * | 2/2012 | Wu | H02M 3/1588 323/235 |
| 2016/0248324 A1 | * | 8/2016 | Young | H02M 3/158 |
| 2018/0351455 A1 | * | 12/2018 | Fan | H02M 3/158 |

* cited by examiner

*Primary Examiner* — Peter M Novak
(74) *Attorney, Agent, or Firm* — Lowenstein Sandler LLP

(57) ABSTRACT

An integrated circuit including a buck converter having an integrator and a shunt resistor is described. The buck converter may operate in a continuous conduction mode (CCM) and a discontinuous conduction mode (DCM). The integrator may be coupled to the buck converter to generate an output voltage based on adjustment of a detected voltage across a load of the buck converter within range of a reference voltage. The shunt resistor may be coupled to the integrator configured to maintain the output voltage of the integrator during the DCM.

17 Claims, 8 Drawing Sheets

Determine whether a buck converter in operating in a continuous conduction mode (CCM) or a discontinuous conduction mode (DCM), wherein the buck converter is configured to operate in the CCM and the DCM. 510

Responsive determining that the buck converter is operating in the DCM, apply, by a shunt resistor, resistance to an output voltage of an integrator of the buck converter to maintain the output voltage of the integrator. 520

Detect whether an inductor current of a constant-on-time (COT) buck converter crosses zero amps a predetermined number of instances, wherein the COT buck converter is configured to operate in a continuous conduction mode (CCM) and a discontinuous conduction mode (DCM). 610

Responsive to detecting that the inductor current of the COT buck converter crossed zero the predetermined number of instances, generate a DCM signal to activate a switch coupled between a shunt resistor and a buffer offset, wherein the DCM signal indicates that the COT buck converter is operating in the DCM. 620

Apply resistance to an output voltage of an integrator based on the offset buffer. 630

FIG. 6

IMPLEMENTING A BUCK CONVERTER SUPPORTING AUTOMATIC CONTINUOUS CONDUCTION MODE AND DISCONTINUOUS CONDUCTION MODE

RELATED APPLICATIONS

This application claims the benefit of U.S. Provisional Patent Application No. 63/292,195, filed Dec. 21, 2021, which is hereby incorporated herein by reference.

BACKGROUND

A buck converter (e.g., step-down converter) is a DC-DC converter used to efficiently convert high voltage to low voltage. In particular, buck converters are used in electronic devices (e.g., smartphones, tablets, notebook computers, laptop computers, etc.) to efficiently extend battery life despite increased usage of battery-powered applications.

BRIEF DESCRIPTION OF THE DRAWINGS

The present disclosure is illustrated by way of example, and not by way of limitation, in the figures of the accompanying drawings.

FIG. 5 is a flow diagram of a method of automatically operating the buck converter in discontinuous conduction mode in accordance with one or more aspects of the present disclosure.

FIG. 6 is a flow diagram of a method of automatically operating the buck converter in discontinuous conduction mode in accordance with one or more aspects of the present disclosure.

DETAILED DESCRIPTION

Figure 1A:
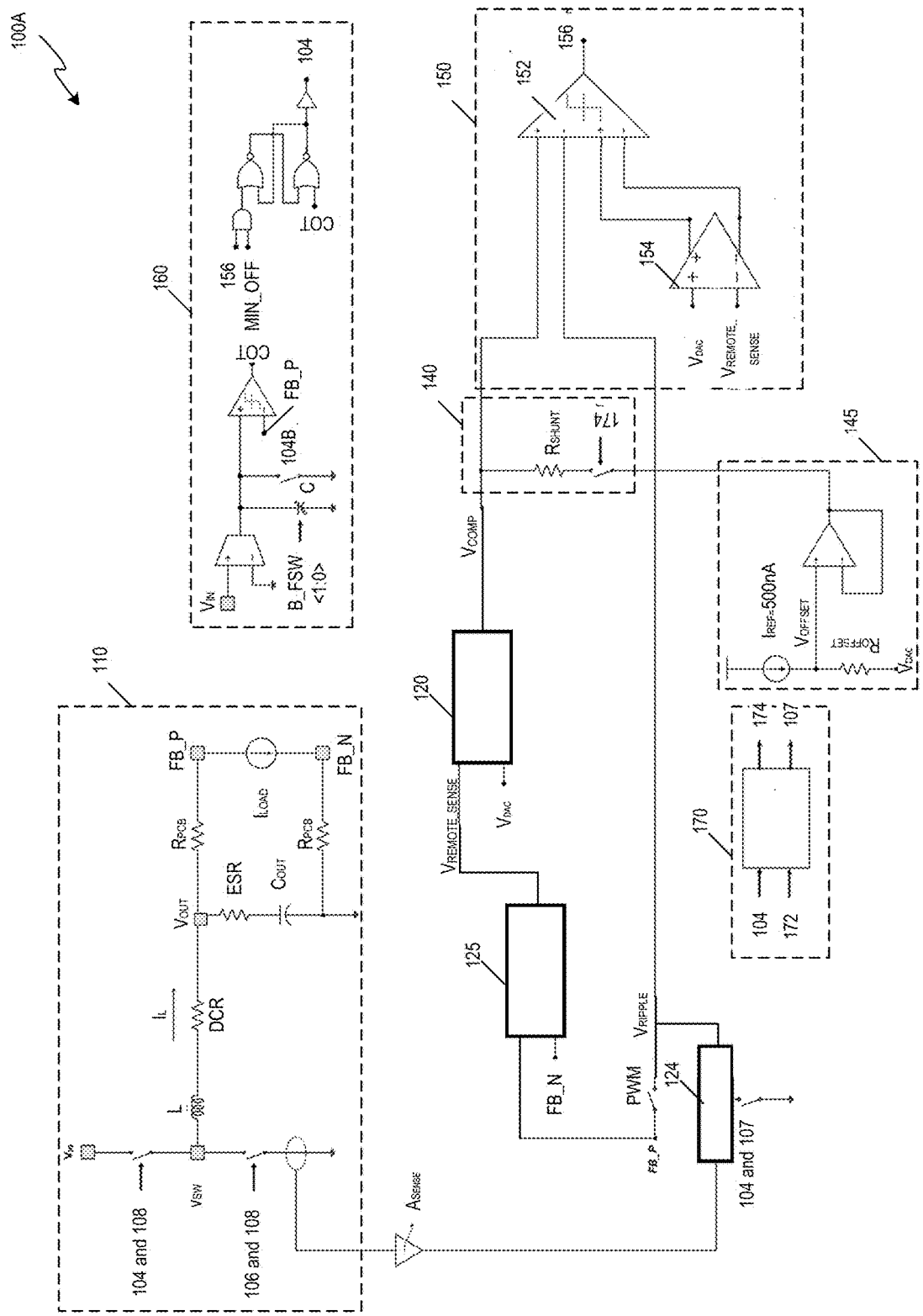
FIG. 1A is a schematic diagram of a buck converter in accordance with one or more aspects of the present disclosure.

Traditionally, a buck converter is a circuit used to convert high voltage to low voltage. In particular, at start up, the circuit may start in an off-state (i.e., the switch of the buck converter is open), thus the current in the circuit is zero. Upon changing from an off-state to an on-state (i.e., the switch of the buck converter transitions from opened to closed), the current is increasingly introduced into the circuit, causing an inductor of the circuit to produce an opposing voltage across terminals of the circuit in response to the changing current. As a result, the opposing voltage counteracts the source voltage, thus reducing a net voltage across a load of the circuit.

Voltage at the load of the circuit can increase due to decreases of the current and the voltage across the inductor. Accordingly, the inductor stores energy in the form of a magnetic field. If the circuit is switched to an off-state during charging voltage across the inductor may drop, resulting in a net voltage at the load less than the input voltage source. Voltage source may be removed from the circuit with each subsequent switch to an off-state during charging, thereby decreasing the current in the circuit. The decreased current produces voltage drops across the inductor as a result causing the inductor to become a current source.

The energy stored in the form of a magnetic field in the inductor supports the current flow through the load, during disconnection of the voltage source, to provide a total load current which is equal to the average inductor current. The total load current, which is equal to the average inductor current, compensates for the reduction in voltage and preserves power provided to the load of the circuit. The inductor, during the off-state, discharges the stored energy into the rest of the circuit. Switching to the on-state prior to full discharge of the inductor, the voltage at the load is greater than zero.

In conventional buck converters constant-on-time (COT) controller have faster transient response compared to fixed-frequency peak/valley current-mode architectures. The implementation of the COT controller compares sensed voltage to a reference voltage to produce a pulse width modulation (PWM) pulse to control the closing of a high-side switch. Typically, the COT controller includes a compensation circuit (e.g., filter) in the voltage feedback loop for stability. Additionally, the COT controller includes a ripple generator in the current feedback loop to produce a ripple that is the same phase as the inductor current. Accordingly, the voltage and current loops combine to generate and/or initiate the PWM signal in CCM operation.

Buck converters can be implemented with continuous conduction mode (CCM) and/or discontinuous conduction mode (DCM) support. Buck converters implemented with only CCM support allow the inductor valley current to reach zero or positive/negative in the loop operations. Buck converters implemented with DCM support monitor inductor valley to ensure tri-stating of the power stage when the inductor current reaches zero current.

Typically, buck converters implemented with DCM support provide higher efficiency than those implemented solely with CCM support. In particular, if an output voltage is determined to be decreasing significantly, a comparator of the DCM implemented buck converter may initiate a PWM pulse for a predetermined time period based on the COT controller. Once the time period has expired, the PWM pulse is terminated, causing the inductor current to fall (e.g., decrease), at which point a zero-cross-detector (ZCD) detects when the inductor current reaches zero. Once the inductor current crosses zero, the switch is tri-stated (e.g., assuming a high impedance state to remove the input from the buck converter), causing the inductor current to return to zero.

Accordingly in DCM operation, the time elapsed before the initiation of subsequent PWM pulses is directly proportional to the inductor, the capacitor, the $T_{ON}$ (on-time) of the COT controller, and the load current of the buck converter, which determines a DCM switching frequency (i.e., DCM switching frequency is proportional to the load current). Thus, the lower the load current, the slower the output capacitor will discharge, causing the output voltage to decrease more slowly; thus the PWM pulse is initiated after a longer delay. As a result, the DCM switching frequency becomes directly proportional to the load current. As the load current decreases, the switching frequency decreases, and the switching losses decrease, therefore the power efficiency increases while in DCM operation as compared to in CCM operation with the same load current. During DCM operation, the output voltage may exceed the reference voltage due to initiation of the PWM pulse as a result of the inductor current increasing from zero to a positive value and back to zero. (e.g., due to the ZCD operation). Typically, the increase of the inductor current from zero to a positive value and back to zero indicates that the voltage loop takes over in absence of the current loop. Accordingly, due to the initiation of the PWM pulse ($T_{ON}$), a finite amount of positive charge (e.g., energy) is transferred to the output capacitor thus exceeding the discharge current. As a result, the error amplifier identifies the finite differential voltage at its input. Accordingly, with the error amplifier incorporating an integrator (for high DC regulation in CCM operation) the output of the error amplifier will rail out (e.g., reach negative rail voltage or decrease to zero voltage) in time unless a subsequent PWM pulse is initiated in DCM operation.

The embodiments described herein are directed towards implementing a shunt resistor in parallel with an output of the integrator. Resistance from the shunt resistor, driven by an offset buffer, can be applied to the output of the integrator, during the DCM, based on a switch between the offset buffer and the shunt resistor. Accordingly, when the buck converter is in DCM, an output of the offset buffer is applied to the shunt resistor, thereby reducing DC gain of the buck converter's feedback loop and preventing the output voltage of the integrator from reaching a negative rail voltage (e.g., maintains the output voltage of the integrator). Additionally, a feedforward circuit coupled to a differential difference amplifier (DDA) based 4-input PWM comparator can assist in accelerating the initiation of the PWM pulse due to the feedforward circuit having a faster transient response compared to the integrator. In particular, when the output voltage may be far from a ripple voltage that causes the initiation of the PWM pulse to be delayed, the DDA-based PWM comparator provides a wideband proportional gain to the error voltage (difference between output and reference voltage ($V_{DAC}$)) to accelerate the initiation of the PWM pulse. Depending on the embodiment, the shunt resistor and the wideband programmable and proportional gain stage may be applied to a single-phase buck converter or a multi-phase buck converter.

FIG. 1A is a schematic diagram of a circuit architecture 100A in accordance with one or more aspects of the present disclosure. The circuit architecture 100A includes a buck converter 110, an integrator 120, a ripple generator 124, a lossy circuit 140, an offset buffer 145, a feedforward circuit 150, a constant-on-time (COT) controller 160, and a DCM signal generator 170.

The buck converter 110 can be a single-phase buck converter. The buck converter 110 (e.g., a synchronous buck converter) includes a first switch, such as a MOSFET, between an input voltage ($V_{IN}$) and a node ($V_{SW}$) and a second switch, such as a MOSFET, between the node $V_{SW}$ and a ground potential. The buck converter 110 can operate in both CCM and DCM. The first switch is controlled by a PWM pulse 104 and a tri-state signal (e.g., TRI_N signal) 108 (e.g., not tri-state signal 107 or opposite of the tri-state signal 107). Accordingly, the first switch is activated by the PWM pulse 104 and non tri-stated (e.g., TRI_N signal 108). The second switch is controlled by a PWM_N pulse 106 (e.g., not PWM_N pulse 106 or opposite of the PWM_N pulse 106) and a TRI_N signal 108 (e.g., not tri-state signal 107 or opposite of the tri-state signal 107). Accordingly, the second switch is activated by the non PWM pulse (e.g., PWM_N pulse 106) and non tri-stated (e.g., TRI_N signal 108). The tri-state signal 108 is generated from the DCM signal generator 170. The tri-state signal refers to a signal to tri-state the power stage and disconnects the power switches in the half-bridge from the output load. The buck converter 110 includes an inductor L and a DC resistance (DCR) coupled to the node $V_{SW}$ providing an inductance current ($I_L$) of the inductor L. The buck converter 110 further includes an equivalent series resistor (ESR) and an output capacitance ($C_{OUT}$) coupled between the output voltage $V_{OUT}$ and ground. The buck converter 110 may drive a load current ($I_{LOAD}$) across the output voltage ($V_{OUT}$) and ground. In particular, between a first feedback node (FB_P) (e.g., positive feedback node) and a second feedback node (FB_N) (e.g., negative feedback node).

Additionally, the circuit architecture 100A may include a current sense circuit ($A_{SENSE}$) coupled between the node $V_{SW}$ and ground. The current sense circuit ($A_{SENSE}$) senses, during the PWM_N pulse 106, the falling slope of an inductor current $I_L$ of the buck converter 110 with a given current gain, for example, 10 µA/A. Depending on the embodiment, the inductor current $I_L$ may have a triangular waveform during switching, as a result, containing a maximum value indicated by the peak and a minimum value indicated by the valley. Accordingly, during sensing of the inductor current $I_L$ across the low-side switch, the falling slope of the inductor current $I_L$ culminating in the valley point is being monitored. In accordance with the COT controller, a $T_{ON}$ (on-time) is fixed and a $T_{OFF}$ (off-time) is variable, thus to determine when the next PWM pulse is initiated, the falling slope of the inductor current $I_L$ after $T_{ON}$ (on-time) is provided to the COT controller. Typically, buck converters, during steady state, must follow the inductor volt-second balance to ensure the output voltage is equal to $T_{ON}/(T_{ON}+T_{OFF})\times V_{IN}$. Thus, the current feedback, during off-time, works in conjunction with the voltage loop to ensure that the output voltage is regulated. During load insertion, if an output voltage decreases rapidly an output of the error amplifier increases in response to the rapidly decreasing output voltage. As such, the sensed current may intersect with the rising output of the error amplifier more quickly (e.g., the valley may be a much higher current value), thereby initiating the next PWM pulse much faster until the output voltage has reached steady-state. With the next PWM pulse being initiated much faster, the $T_{OFF}$ and hence the $T_{SW}$ is decreased. $T_{SW}$ may refer to the buck converter's CCM switching frequency (e.g., $T_{SW}=T_{ON}+T_{OFF}$ in CCM).

The circuit architecture 100A may include a ripple generator 124 configured to generate a voltage ripple $V_{RIPPLE}$. Depending on the embodiment, the ripple generator 124 may include a capacitor to provide a reasonable common-mode voltage to set the output of the error amplifier of the integrator 120 and a ripple resistor to set the voltage gain of the current feedback. Thus, the voltage ripple $V_{RIPPLE}$ may be based on the current sense circuit $A_{SENSE}$ multiplied by the ripple resistor plus the voltage across the ripple capacitor. The ripple generator 124 may be grounded based on a switch disposed between the ripple generator 124 and potential ground activated by the PWM pulse 104 and tri-state signal 107. The circuit architecture 100A may include the integrator 120 configured to receive, by an error amplifier of the integrator 120, a sensed voltage ($V_{REMOTE\_SENSE}$) of the buck converter 110 (e.g., the voltage at the load of the buck converter 110) and a reference voltage ($V_{DAC}$) to generate a compensating error voltage to adjust the sensed voltage $V_{REMOTE\_SENSE}$ towards the reference voltage $V_{DAC}$. Depending on the embodiment, the reference voltage $V_{DAC}$ may be predetermined or configurable. In some embodiments, the reference voltage $V_{DAC}$ may be ramped up to control adjustment of the sensed voltage $V_{REMOTE\_SENSE}$. To determine the sensed voltage $V_{REMOTE\_SENSE}$ from the buck converter 110, the circuit architecture 100A implements a remote sense amplifier 125 (e.g., differential-to-single-ended conversion circuit) connected to the first and second feedback node (FB_P and FB_N) and outputs the sensed voltage $V_{REMOTE\_SENSE}$. Depending on the embodiment, the error amplifier of the integrator 120 may be an operational trans-conductance amplifier or a $G_M$ stage.

During DCM operation, as noted above, the error amplifier incorporating the integrator structure causes the output of the error amplifier to rail out. Accordingly, the lossy circuit 140 of the circuit architecture 100A is configured to prevent the integrator 120 from railing out (e.g., the output voltage $V_{COMP}$ reaching a negative rail voltage). Thus, a shunt resistor ($R_{SHUNT}$) of the lossy circuit 140 is coupled in parallel with an output resistance ($R_{OUT}$) of the integrator 120. Depending on the embodiment, the shunt resistor $R_{SHUNT}$ of the lossy circuit 140 may be a resistor in an order of magnitude lower than the output resistance ($R_{OUT}$) of the integrator 120 (e.g., two orders of magnitude lower). The lossy circuit 140 includes a third switch controlled by a DCM signal that is triggered when the buck converter 110 is in the DCM. During the DCM, the offset buffer 145 is used to apply voltage bias to the shunt resistor $R_{SHUNT}$ of the lossy circuit 140. Depending on the embodiment, the offset buffer 145 may apply the reference voltage $V_{DAC}$ to an offset resistor ($R_{OFFSET}$). The offset buffer 145 may receive a current load reference ($I_{REF}$) to generate an offset voltage ($V_{OFFSET}$). The output of the offset buffer is applied to the shunt resistor $R_{SHUNT}$ of the lossy circuit 140 to apply resistance to the output voltage $V_{COMP}$ to prevent the output voltage $V_{COMP}$ from reaching a negative rail voltage. In some instances, instead of applying the reference voltage $V_{DAC}$ to an offset resistor ($R_{OFFSET}$) to generate an offset voltage ($V_{OFFSET}$). The current load reference $I_{REF}$ may be configurable based on various aspects of the circuit architecture 100A. Accordingly, once the buck converter 110 is not in the DCM, the integrator 120 may operate normally without any additional influence on the output voltage $V_{COMP}$ from the integrator. Other offset buffers are contemplated to assist in generating sufficient resistance to prevent the output voltage $V_{COMP}$ from reaching a negative rail voltage.

In some instances, during the DCM, the output voltage $V_{COMP}$ of the integrator 120 may be far from the ripple voltage, which causes delayed reaction during load insertion (e.g., delays the PWM pulse initiation signal (156) to the COT controller 160). Inherently, the integrator 120 contains a certain level of DC gain to assist in the PWM pulse initiation signal 156 at the PWM comparator. Accordingly, the circuit architecture 100A utilizes the feedforward circuit 150 to speed up the loop response by using a differential difference amplifier (DDA-based PWM comparator) based 4-input PWM comparator 152 which receives the output voltage $V_{COMP}$, the ripple voltage, a first and second output of a fully differential amplifier 154. The first and second output of the fully differential amplifier 154 is based on the reference voltage $V_{DAC}$ and the sensed voltage ($V_{REMOTE\_SENSE}$) of the buck converter 110. Thus, the fully differential amplifier 154 allows the PWM pulse 104 to react much quicker to load insertion during the DCM operation of the buck converter 110 without interfering with the CCM operation of the buck converter 110.

The COT controller 160 of the circuit architecture 100A determines a constant time period for which to generate the PWM pulse 104. The constant-on-time signal is generated from the input voltage $V_{IN}$ and the voltage at the first feedback node FB_P. The PWM pulse 104 is generated according to the PWM pulse initiation signal 156 from the DDA-based PWM comparator 152 of the feedforward circuit 150 and the constant-on-time signal.

The DCM signal generator 170 of the circuit architecture 100A determines whether the buck converter 110 is in the DCM or the CCM. In particular, based on the PWM_N pulse 106 and an output of a zero-cross-detector circuit (ZCD) (not shown), the DCM signal generator 170 may generate a DCM signal 174, then as a result of generating the DCM signal 174, the DCM signal generator 170 generates the tri-state signal 107. Accordingly, the DCM signal 174 is interrelated with the tri-state signal 107. In particular, the DCM signal generator 170 generates the DCM signal 174 by detecting whether the load current $I_{LOAD}$ has crossed the zero current more than a predetermined number of times ($N_{ZCD}$) (e.g., 7 times) consecutively. Once the buck converter 110 is in the DCM, if the load current $I_{LOAD}$ does not cross the zero current, the DCM signal generator 170 pulls the DCM signal 174 low.

Figure 1B:
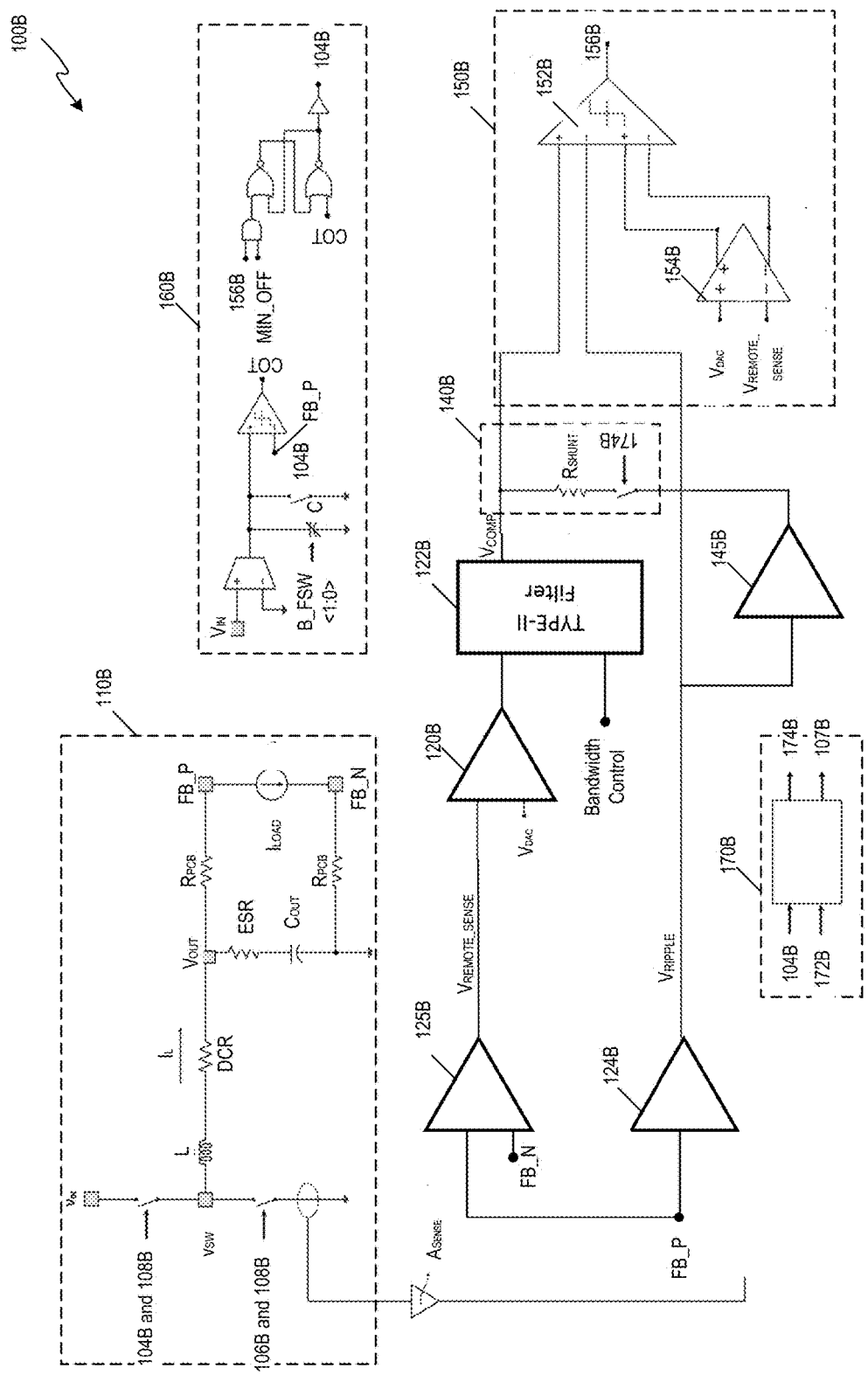
FIG. 1B is another schematic diagram of a buck converter in accordance with one or more aspects of the present disclosure.

FIG. 1B is yet another example of a schematic diagram of a circuit architecture 100A (e.g., circuit architecture 100B) in accordance with one or more aspects of the present disclosure. The circuit architecture 100B includes a buck converter 110B similar to buck converter 110 of FIG. 1A, a remote sense amplifier 125n, a ripple injector 124B (e.g., ripple generator), an operational trans-conductance amplifier (OTA) 120n, a type-II filter 122n, an offset buffer 145n, a lossy circuit 140n, a feedforward circuit 150n, a constant-on-time (COT) controller 160n, and a DCM signal generator 170B.

The circuit architecture 100B may include a current sense circuit ($A_{SENSE}$) to sense, during the PWM_N pulse 106n, the falling slope of an inductor current $I_L$ of the buck converter 110B, during the PWM_N pulse 106B with a given current gain, for example, 10 μA/A. Depending on the embodiment, the inductor current $I_L$ may have a triangular waveform during switching, as a result, containing a maximum value indicated by the peak and a minimum value indicated by the valley. Accordingly, during sensing of the inductor current $I_L$ across the low-side switch, the falling slope of the inductor current $I_L$ culminating in the valley point is being monitored. In accordance with the COT controller, a $T_{ON}$ (on-time) is fixed and a $T_{OFF}$ (off-time) is variable, thus to determine when the next PWM pulse is initiated, the falling slope of the inductor current $I_L$ after $T_{ON}$ (on-time) is provided to the COT controller. Typically, buck converters, during steady state, must follow the inductor volt-second balance to ensure the output voltage is equal to $T_{ON}/(T_{ON}+T_{OFF}) \times V_{IN}$. Thus, the current feedback, during off-time, works in conjunction with the voltage loop to ensure that the output voltage is regulated. During load insertion, if an output voltage decreases rapidly an output of the error amplifier increases in response to the rapidly decreasing output voltage. As such, the sensed current may intersect with the rising output of the error amplifier more quickly (e.g., the valley may be a much higher current value), thereby initiating the next PWM pulse much faster until the output voltage has reached steady-state. With the next PWM pulse being initiated much faster, the $T_{OFF}$ and the $T_{SW}$ is decreased. $T_{SW}$ may refer to the buck converter's CCM switching frequency (e.g., $T_{SW}=T_{ON}+T_{OFF}$ in CCM).

The circuit architecture 100B may include an OTA 120B configured to receive, by the remote sense amplifier 125B, a sensed voltage ($V_{REMOTE\_SENSE}$) of the buck converter 110B (e.g., the voltage at the load of the buck converter 110B) corresponding to the voltage at the load of buck converter 110B and a reference voltage ($V_{DAC}$) to generate a compensating error voltage to adjust the sensed voltage $V_{REMOTE\_SENSE}$ towards the reference voltage $V_{DAC}$. Depending on the embodiment, the reference voltage $V_{DAC}$ may be predetermined or configurable. In some embodiments, the reference voltage $V_{DAC}$ may be ramped up to control adjustment of the sensed voltage $V_{REMOTE\_SENSE}$. To determine the sensed voltage $V_{REMOTE\_SENSE}$ from the buck converter 110B, the circuit architecture 100B implements a remote sense amplifier 125B connected to the first and second feedback node (FB_P and FB_N) and outputs the sensed voltage $V_{REMOTE\_SENSE}$. The circuit architecture 100B may further include a type-II filter 122B controlled with bandwidth control signals that causes, during DCM operation, as noted above, the output of the OTA 120B (e.g., $V_{COMP}$) to rail out. In some instances, the type-II filter 122B may be adjusted according to the bandwidth control signals to speed up (e.g., increase) the output response of the type-II filter 122B during DCM. In some instances, the bandwidth control signal may be selectable to further correct any voltage error at the type-II filter 122B during switching from DCM to CCM.

Accordingly, the lossy circuit 140B of the circuit architecture 100B is configured to prevent the output of the OTA 120B from railing out (e.g., the output voltage $V_{COMP}$ reaching a negative rail voltage). Thus, a shunt resistor ($R_{SHUNT}$) of the lossy circuit 140B is coupled in parallel with the type-II filter 122B. Depending on the embodiment, the shunt resistor $R_{SHUNT}$ of the lossy circuit 140B may be a resistor in an order of magnitude lower than the output resistance ($R_{OUT}$) of the type-II filter 122B (e.g., two orders of magnitude lower). The lossy circuit 140B includes a third switch controlled by a DCM signal that is triggered when the buck converter 110B is in the DCM. During the DCM, the offset buffer 145B is used to generate resistance in the shunt resistor $R_{SHUNT}$ of the lossy circuit 140B. Depending on the embodiment, the offset buffer 145B may apply a voltage ripple ($V_{RIPPLE}$) generated by the ripple injector 124B into an offset buffer such that the output of the offset buffer is applied to the shunt resistor $R_{SHUNT}$ of the lossy circuit 140B to apply resistance to the output of the OTA 120B to prevent the output voltage $V_{COMP}$ from reaching a negative rail voltage. Accordingly, once the buck converter 110B is not in the DCM, the OTA 120B may operate normally without any additional influence on the output of the OTA 120B. Other offset buffers are contemplated to assist in generating sufficient resistance to prevent the output of the OTA 120B from reaching a negative rail voltage.

In some instances, during the DCM, the output of the OTA 120B may be far from the first feedback node (FB_P), which causes delayed reaction during load insertion (e.g., delays the PWM pulse initiation signal (156B) to the COT controller 160B). Inherently, the OTA 120B contains a certain level of DC gain to assist in the PWM pulse initiation signal 156B at the PWM comparator. Accordingly, the circuit architecture 100B utilizes the feedforward circuit 150B to speed up the loop response by using a differential difference amplifier (DDA-based PWM comparator) based 4-input PWM comparator 152B which receives the output of the OTA 120B (e.g., the output voltage $V_{COMP}$), the first feedback node (FB_P), a first and second output of a fully differential amplifier 154B. The first and second output of the fully differential amplifier 154B is based on the reference voltage $V_{DAC}$ and the sensed voltage ($V_{REMOTE\_SENSE}$) of the buck converter 110B. Thus, the fully differential amplifier 154B allows the PWM pulse 104B to react much quicker to load insertion during the DCM operation of the buck converter 110B without interfering with the CCM operation of the buck converter 110B.

The COT controller 160B of the circuit architecture 100B determines a constant time period for which to generate the PWM pulse 104B. The constant-on-time signal is generated from the input voltage $V_{IN}$ and the voltage at the first feedback node FB_P. The PWM pulse 104B is generated according to the PWM pulse initiation signal 156B from the DDA-based PWM comparator 152B of the feedforward circuit 150B and the constant-on-time signal.

The DCM signal generator 170B of the circuit architecture 100B determines whether the buck converter 110B is in the DCM or the CCM. In particular, based on the PWM_N pulse 106B and an output of a zero-cross-detector circuit (ZCD) (not shown), the DCM signal generator 170B may generate a DCM signal 174n, then as a result of generating the DCM signal 174n, the DCM signal generator 170B generates the tri-state signal 107B and, in some instances, the bandwidth control to feed into the type-II filter 122B. Accordingly, the DCM signal 174B is interrelated with the tri-state signal 107B. In particular, the DCM signal generator 170B generates the DCM signal 174B by detecting whether the load current $I_{LOAD}$ has crossed the zero current more than a predetermined number of times ($N_{ZCD}$) (e.g., 7 times) consecutively. Once the buck converter 110B is in the DCM, if the load current $I_{LOAD}$ does not cross the zero current, the DCM signal generator 170B pulls the DCM signal 174B low.

Figure 2A:
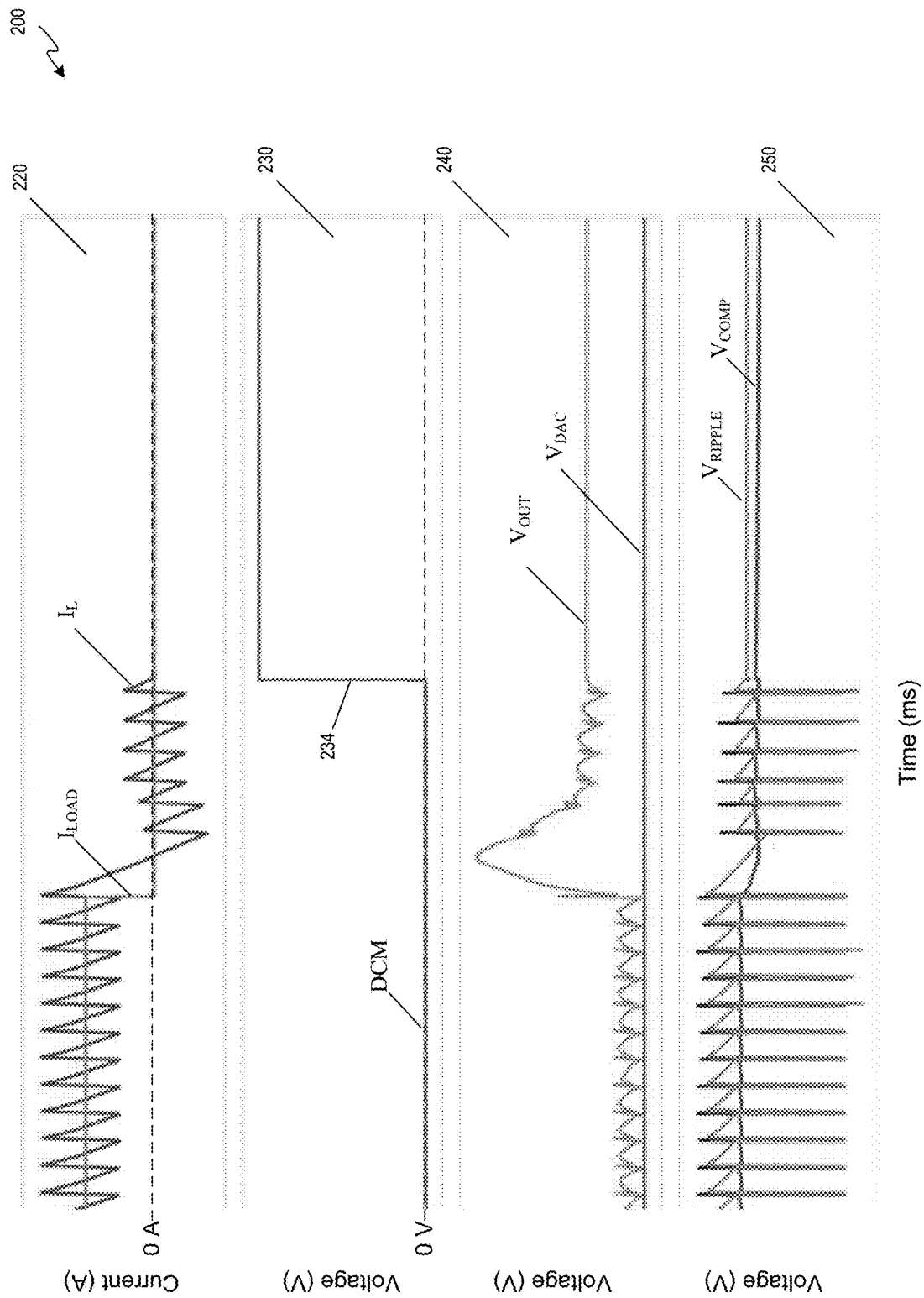
FIG. 2A is a graph illustrating the mode buck converter of FIG. 1A automatically switching out of discontinuous conduction mode in accordance with one or more aspects of the present disclosure.

FIG. 2A illustrates various graphs 200 illustrating operation of the circuit architecture 100A of FIG. 1A. The various graphs 200 are interconnected and each represents different aspects of the circuit architecture 100A over a first period of time (ms), for example, graph 220 represents a graph of the load current $I_{LOAD}$ and the inductor current $I_L$ of the buck converter 110, graph 230 represents a graph of a DCM signal 174 (e.g., measured in voltage), graph 240 represents a graph of the output voltage $V_{OUT}$ and the reference voltage $V_{DAC}$, and graph 250 represents a graph of the output voltage $V_{COMP}$ and ripple voltage $V_{RIPPLE}$.

During the first period of time with the buck converter 110 (of FIG. 1A) in the CCM, the sensed voltage ($V_{REMOTE\_SENSE}$) is maintained close to the reference voltage $V_{DAC}$. Once the load current $I_{LOAD}$ goes to 0A, a spike in the sensed voltage $V_{REMOTE\_SENSE}$ is detected, and the integrator 120 begins to adjust the sensed voltage $V_{REMOTE\_SENSE}$ to be close to the reference voltage $V_{DAC}$. However, as the integrator 120 is adjusting the sensed voltage $V_{REMOTE\_SENSE}$ to be close to the reference voltage $V_{DAC}$, the ZCD 172 of the circuit architecture 100A (not shown) detects that the inductor current $I_L$ has crossed 0A a predetermined number of times ($N_{ZCD}$). At which point, the DCM signal generator 170 generates a DCM signal (at time 234), indicating that the buck converter 110 is in the DCM. Accordingly, even though the sensed voltage $V_{REMOTE\_SENSE}$ (representative of $V_{OUT}$) is higher than the reference voltage $V_{DAC}$, the lossy circuit 140 of the circuit architecture 100A (FIG. 1A) applies resistance to the output voltage $V_{COMP}$ to prevent the integrator 120 from the output voltage $V_{COMP}$ reaching a negative rail voltage (as shown in graph 250). In preventing the integrator 120 from the output voltage $V_{COMP}$ reaching a negative rail voltage, the load transient response for the next load insertion is significantly improved.

Figure 2B:
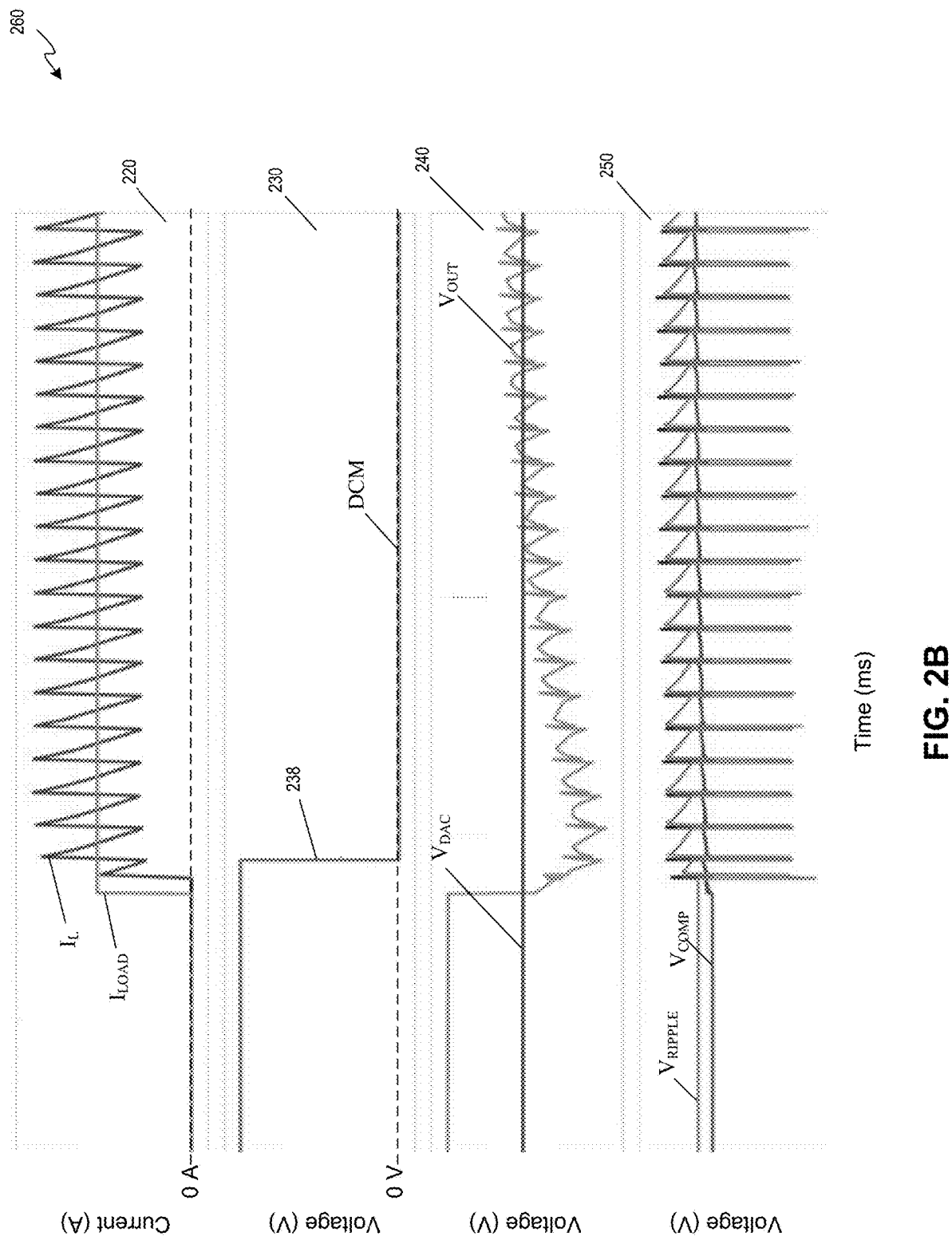
FIG. 2B is a graph illustrating the buck converter of FIG. 1A automatically operating in discontinuous conduction mode in accordance with one or more aspects of the present disclosure.

FIG. 2B illustrates various graphs 260 illustrating operation of the circuit architecture 100A of FIG. 1A. The various graphs 260 of FIG. 2B are similar to the various graphs of 200 of FIG. 2A but over a second period of time (ms). During the second period of time, the buck converter 110 (of FIG. 1A) starts in the DCM and, based on an increase in the load current $I_{LOAD}$, the ZCD 172 of the circuit architecture 100A detects whether the inductor current $I_L$ of the buck converter 110 has crossed OA. If the inductor current $I_L$ does not cross zero, the DCM signal generator 170 pulls the DCM signal 174 (at time 238) low. Accordingly, the lossy circuit 140 is disabled by disengaging the offset buffer from the shunt resistor $R_{SHUNT}$ allowing the integrator to continue adjusting the sensed voltage $V_{REMOTE\_SENSE}$ to be close to the reference voltage $V_{DAC}$. Since the sensed voltage $V_{REMOTE\_SENSE}$ is not close to the reference voltage $V_{DAC}$ and the lossy circuit 140 is disengaged from the integrator 120, the sensed voltage $V_{REMOTE\_SENSE}$ is adjusted towards the reference voltage $V_{DAC}$. The adjustment of the sensed voltage $V_{REMOTE\_SENSE}$ towards the reference voltage $V_{DAC}$ may undershoot the reference voltage $V_{DAC}$, however, the undershoot is within a desired specification of some computing applications. Further, as shown by graph 250, the integrator output voltage $V_{COMP}$ is no longer static.

In some embodiments, the various graphs 200 of FIG. 2A during the first period of time may occur prior to the various graphs 260 of FIG. 2B during the second period of time. In some embodiments, the various graphs 200 of FIG. 2B during the first period of time may occur subsequent to the various graphs 260 of FIG. 2B during the second period of time. Depending on the embodiment, various events that occur during the first period of time may occur during the second period of time. Depending on the embodiment, various events that occur during the second period of time may occur during the first period of time.

Figure 3:
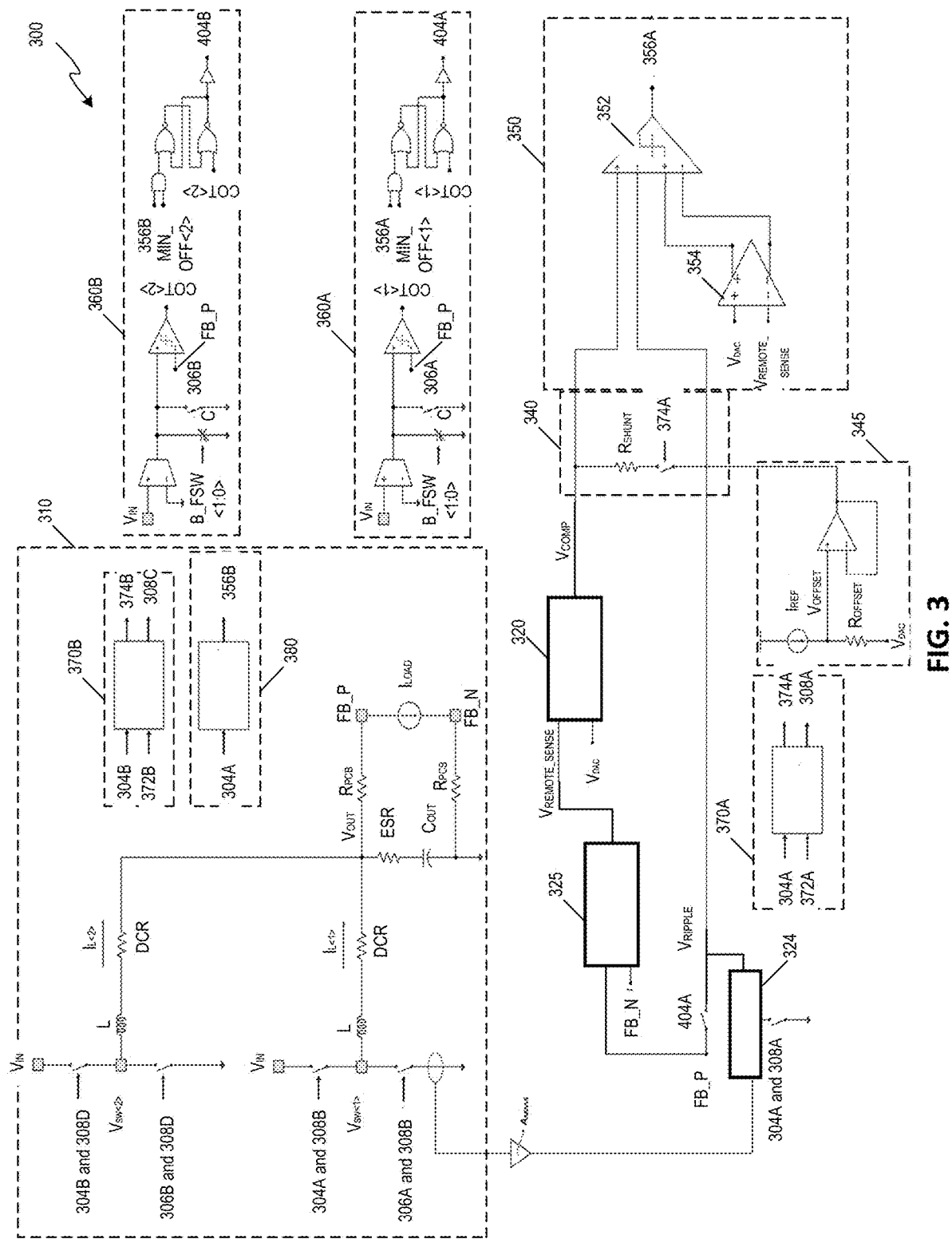
FIG. 3 is a schematic diagram of another example of the buck converter in accordance with one or more aspects of the present disclosure.

FIG. 3 is a schematic diagram of a circuit architecture 300 in accordance with one or more aspects of the present disclosure. The circuit architecture 300 includes a buck converter 310, which is a multi-phase buck converter rather than the single-phase buck converter of circuit architecture 100A. The circuit architecture 300 includes an integrator 320, a ripple generator 324, a lossy circuit 340, an offset buffer 345, a feedforward circuit 350 similar to the integrator 120, the lossy circuit 140, the offset buffer 145, and the feedforward circuit 150 of circuit architecture 100A. The circuit architecture 300 includes a first constant-on-time (COT) controller 360A and a second constant-on-time (COT) controller 360B operates similar to the constant-on-time (COT) controller 160 of circuit architecture 100A and a first DCM signal generator 370A and a second DCM signal generator 370B operates similar to the DCM signal generator 170 of circuit architecture 100A but in accordance with the multi-phase nature of buck converter 310.

The circuit architecture 300 further includes a phase interleaving circuit 380. The phase interleaving circuit 380 is configured to control timing and switching frequency of the second power stage of a multi-phase buck converter or buck converter 310 (e.g., interleave or cycle between power stages). In particular, the phase interleaving circuit 380 may include an adaptive circuit (not shown) to adapt or vary an amount of delay between each power stage to preserve steady stage operation across load, process, voltage, and temperature variations. The phase interleaving circuit 380 further includes a filter circuit (not shown) to filter a voltage or signal generated from the adaptive circuit. For example, the phase interleaving circuit 380 receives the first PWM pulse (PWM<1>) 304A to generate a second PWM pulse initiation signal (PWM_INT<2>) 356B.

The buck converter 310 circuit includes a first switch, such as a MOSFET, between an input voltage ($V_{IN}$) and a first node ($V_{SW}$<1>) and a second switch, such as a MOSFET, between the first node $V_{SW}$<1> and ground. The first switch is controlled by a PWM pulse (PWM<1>) 304A and a first tri-state signal (e.g., tri_N<1>) 308B (e.g., non first tri-state signal 308A or opposite of the first tri-state signal 308A). Accordingly, the first switch is activated by the PWM pulse 304 and non tri-stated (e.g., first tri-state signal 308B). The second switch is controlled by a PWM_N pulse 306A (e.g., non PWM_N pulse 306A or opposite of the PWM_N pulse 306A) and a first tri-state signal 308B (e.g., non first tri-state signal 308A or opposite of the first tri-state signal 308A). Accordingly, the second switch is activated by the non PWM pulse (e.g., PWM_N pulse 306A) and non tri-stated (e.g., first tri-state signal 308B).

The first tri-state signal 308B is generated from the DCM signal generator 370A. As noted above, the tri-state signal (e.g., the first tri-state signal 308B) refers to a signal to tri-state the power stage and disconnects the inductor from the output load. The buck converter 310 includes an inductor L and a DC resistance (DCR) coupled to the first node $V_{SW}$<1>, providing a first inductance current ($I_L$<1>) of the first inductor L. The buck converter 310 further includes an equivalent series resistor (ESR) and an output capacitance ($C_{OUT}$) coupled between the output voltage $V_{OUT}$ and ground. The buck converter 310 may drive a load current ($I_{LOAD}$) across the output voltage ($V_{OUT}$) and ground. In particular, between a first feedback node (FB_P) (e.g., positive feedback node) and a second feedback node (FB_N) (e.g., negative feedback node).

The buck converter 310 is a multi-phase buck converter. Accordingly, the buck converter 310 further includes a third switch, such as a MOSFET, between an input voltage ($V_{IN}$) and a second node ($V_{SW}$<2>) and a fourth switch, such as a MOSFET, between the second node $V_{SW}$<2> and a ground potential. The third and fourth switches are controlled by a second PWM pulse (PWM<2>) 304B and a second tri-state signal (e.g., tri_N<2>) 308C. The buck converter further includes a second inductor L and a second DC resistance (DCR) coupled between the second node $V_{SW}$<2> and the output voltage $V_{OUT}$, providing a second inductance current ($I_L$<2>) of the second inductor L to the output voltage $V_{OUT}$.

Additionally, similar to circuit architecture 100A, circuit architecture 300 may include a current sense circuit ($A_{SENSE}$) coupled between the first node $V_{SW}$<1> and ground. The current sense circuit ($A_{SENSE}$) senses an inductor current $I_L$<1> Of the buck converter 310, during the PWM_N pulse 306A, to determine if the inductor current $I_L$<1> of the buck converter 310 has reached a predetermined inductor current $I_L$<1> (e.g., valley current). As noted above, the inductor current $I_L$<1> may have a triangular waveform during switching, as a result, containing a maximum value indicated by the peak and a minimum value indicated by the valley. During load insertion, if an output voltage decreases rapidly an output of the error amplifier increases in response to the rapidly decreasing output voltage. As such, the sensed current may intersect with the rising output of the error amplifier more quickly, thereby initiating the next PWM pulse much faster until the output voltage has reached steady-state.

The circuit architecture 300 may include a ripple generator configured to generate a voltage ripple $V_{RIPPLE}$. Depending on the embodiment, the ripple generator 124 may include a capacitor to provide a reasonable common-mode voltage to set the output of the error amplifier of the integrator 320 and a ripple resistor to set the voltage gain of the current feedback. Thus, the voltage ripple $V_{RIPPLE}$ is based on the current sense circuit $A_{SENSE}$ multiplied by the ripple resistor plus the voltage across the ripple capacitor. The ripple generator 324 may be grounded based on a switch disposed between the ripple generator 324 and potential ground activated by the first PWM pulse 304A and the first tri-state signal 308A. The circuit architecture 300 may include the integrator 320 configured to receive, by an error amplifier of the integrator 320) a sensed voltage ($V_{REMOTE\_SENSE}$) of the buck converter 310 (e.g., the voltage at the load of the buck converter 310) and a reference voltage ($V_{DAC}$) to generate a compensating error voltage to adjust the sensed voltage $V_{REMOTE\_SENSE}$ towards the reference voltage $V_{DAC}$. Depending on the embodiment, the reference voltage $V_{DAC}$ may be predetermined or configurable. In some embodiments, the reference voltage $V_{DAC}$ may be ramped up to control adjustment of the sensed voltage $V_{REMOTE\_SENSE}$. To determine the sensed voltage $V_{REMOTE\_SENSE}$ from the buck converter 310, the circuit architecture 100A implements a remote sense amplifier 325 (e.g., differential-to-single-ended circuit conversion) connected to the first and second feedback node (FB_P and FB_N) and outputs the sensed voltage $V_{REMOTE\_SENSE}$. Depending on the embodiment, the error amplifier of the integrator 320 may be an operational trans-conductance amplifier or a $G_M$ stage.

During DCM operation, as noted above, the error amplifier incorporating the integrator structure causes the output of the error amplifier to rail out. Accordingly, the lossy circuit 340 of the circuit architecture 300 is configured to prevent the integrator 320 from railing out (e.g., the output voltage $V_{COMP}$ reaching a negative rail voltage). Thus, a shunt resistor ($R_{SHUNT}$) of the lossy circuit 340 is coupled in parallel with an output resistance ($R_{OUT}$) of the integrator 320. Depending on the embodiment, the shunt resistor $R_{SHUNT}$ of the lossy circuit 340 may be a resistor in an order of magnitude lower than the output resistance ($R_{OUT}$) of the integrator 320 (e.g., two orders of magnitude lower). The lossy circuit 340 includes a third switch controlled by a signal that is triggered when the first power stage of the buck converter 310 is in the DCM. During the DCM, the offset buffer 345 is used to provide voltage bias to the shunt resistor $R_{SHUNT}$ of the lossy circuit 340. Depending on the embodiment, the offset buffer 345 may apply the reference voltage $V_{DAC}$ to an offset resistor ($R_{OFFSET}$) and receive a current load reference ($I_{REF}$) to generate an offset voltage ($V_{OFFSET}$) to input into an offset buffer such that the output of the offset buffer is applied to the shunt resistor $R_{SHUNT}$ of the lossy circuit 340 to apply resistance to the output voltage $V_{COMP}$ to prevent the output voltage $V_{COMP}$ from reaching a negative rail voltage. The current load reference $I_{REF}$ may be configurable based on various aspects of the circuit architecture 300. Accordingly, once the buck converter 310 is not in the DCM, the integrator 320 may operate normally without any additional influence on the output voltage $V_{COMP}$ from the integrator. Other offset buffers are contemplated to assist in generating sufficient resistance to prevent the output voltage $V_{COMP}$ from reaching a negative rail voltage.

In some instances, during the DCM, the output voltage $V_{COMP}$ of the integrator 320 may be far from the ripple voltage, which causes delayed reaction during load insertion (e.g., delays the first PWM pulse initiation signal (PWM_INT<1>) 356A to the first COT controller 360A). Inherently, the integrator 320 contains a certain level of DC gain to assist in the first PWM pulse initiation signal 356A at the PWM comparator. Accordingly, the circuit architecture 300 utilizes the feedforward circuit 350 to speed up the loop response by using a DDA-based PWM comparator 352 which receives the voltage $V_{COMP}$, the ripple voltage, a first and second output of a fully differential amplifier 354. The first and second output of the fully differential amplifier 354 is based on the reference voltage $V_{DAC}$ and the sensed voltage ($V_{REMOTE\_SENSE}$) of the buck converter 310. Thus, the fully differential amplifier 354 allows the first PWM pulse 304A to react much quicker to load insertion during the DCM operation of the buck converter 310 without interfering with the CCM operation of the buck converter 310.

The COT controller 360A of the circuit architecture 300 determines a constant time period in which to generate the first PWM pulse 304A. The constant time period is generated from the input voltage $V_{IN}$ and the voltage at the first feedback node FB_P. The first PWM pulse 304A is generated according to the first PWM pulse initiation signal 356A from the DDA-based PWM comparator 352 of the feedforward circuit 350. Once the first PWM pulse 304A is generated, the phase interleaving circuit 380 receives the first PWM pulse 304A to generate the second PWM pulse 304B.

The DCM signal generator 370A of the circuit architecture 300 determines whether a first power stage of the buck converter 310 is in the DCM or the CCM. In particular, based on the first PWM pulse 304A and an output of a first zero-cross-detector circuit (ZCD<1>) 372A (not shown), the DCM signal generator 370A may generate a first DCM signal 374A.

As a result of generating the first DCM signal 374A, the DCM signal generator 370A generates the first tri-state signal 308A. Accordingly, the first DCM signal 374A is interrelated with the first tri-state signal 308A. In particular, the DCM signal generator 370A generates the first DCM signal 374A by detecting whether the first inductor current $I_L<1>$ has crossed the zero current more than a predetermined number of times ($N_{ZCD}$), consecutively. Once the first power stage of the buck converter 310 is in the DCM, if the first inductor current $I_L<1>$ does not cross the zero current, the DCM signal generator 370A pulls the first DCM signal 374A low. In particular, a first phase inductor current of the multi-phase buck converter is being monitored for any zero crossing by the zero-cross-detector to apply resistance to the integrator's output voltage $V_{COMP}$ to prevent the integrator's output voltage $V_{COMP}$ from reaching a negative rail voltage. In accordance with a multi-phase buck converter, current feedback signal may be solely present in the first phase of the multi-phase buck converter, thereby resulting in the voltage feedback signal also being solely present in the first phase of the multi-phase buck converter 310. Thus, each of the remaining phases (e.g., $N_{PHASE}$ of the multi-phase buck converter) are generated, by the phase interleaving circuit (e.g., 380), based on the first phase PWM pulse.

Accordingly, the DCM signal generator 370B of the circuit architecture 300 determines whether a second power stage of the buck converter 310 is in the DCM or the CCM. The DCM signal generator 370B generates a second DCM signal 374B and a second tri-state signal 308C based on a result of the COT controller 360B of the circuit architecture 300. The COT controller 360B generates, similar to the COT controller 360A, a second PWM pulse 304B based on the second PWM pulse initiation signal 356B, which is received from the phase interleaving circuit 380 rather than from the DDA-based PWM comparator 352. Similar to the DCM signal generator 370A, the DCM signal generator 370B generates the second DCM signal 374B and the second tri-state signal 308C by detecting, via based on an output of a second zero-cross-detector circuit (ZCD<2>) 372B (not shown), the second inductor current $I_L$<2> crossing the zero current more than a predetermined number of times ($N_{ZCD}$), consecutively. Similar to the DCM signal generator 370A, the DCM signal generator 370B pulls the second DCM signal 374B low as a result of detecting, via based the output of the second zero-cross-detector circuit 372B (not shown), that the second inductor current $I_L$<2> does not cross the zero current during the DCM.

Figure 4:
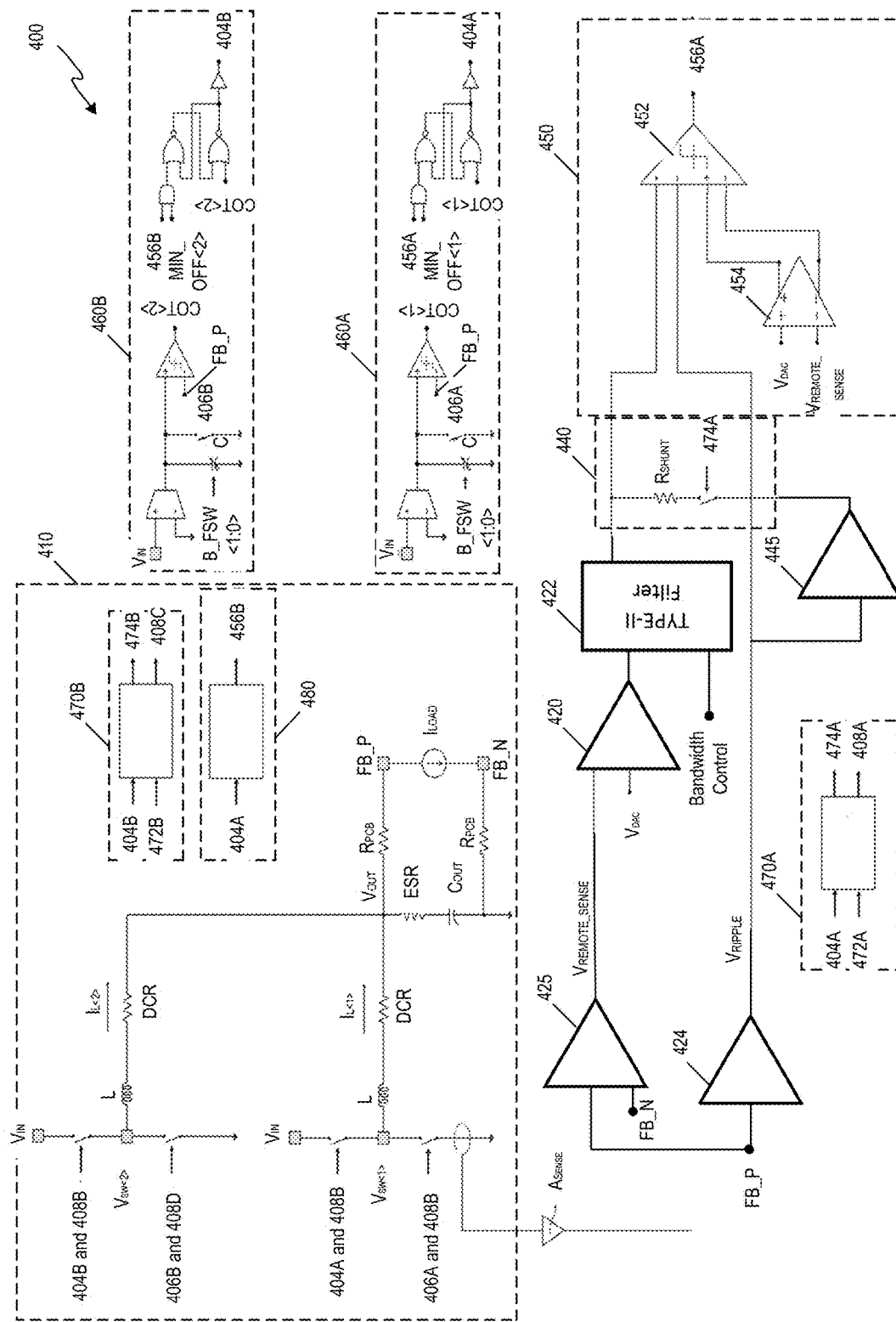
FIG. 4 is another schematic diagram of another example of the buck converter in accordance with one or more aspects of the present disclosure.

FIG. 4 is yet another example of a schematic diagram of a circuit architecture 400 in accordance with one or more aspects of the present disclosure. The circuit architecture 400 includes a buck converter 410 similar to the buck converter 310 of FIG. 3, which is a multi-phase buck converter rather than the single-phase buck converter of circuit architecture 100A or circuit architecture 100B. The circuit architecture 400 includes a remote sense amplifier 425, a ripple injector 424 (e.g., ripple generator), an operational trans-conductance amplifier (OTA) 420, a type-II filter 422, an offset buffer 445, a lossy circuit 440, an offset buffer 445, a feedforward circuit 450. The circuit architecture 400 includes a first constant-on-time (COT) controller 460A and a second constant-on-time (COT) controller 460B operates similar to the constant-on-time (COT) controller 160 of circuit architecture 100A and a first DCM signal generator 470A and a second DCM signal generator 470B operates similar to the DCM signal generator 170 of circuit architecture 100A but in accordance with the multi-phase nature of buck converter 410.

The circuit architecture 400 further includes a phase interleaving circuit 480. The phase interleaving circuit 480 is configured to control timing and switching frequency of the second power stage of a multi-phase buck converter or buck converter 410 (e.g., interleave or cycle between power stages). In particular, the phase interleaving circuit 480 may include an adaptive circuit (not shown) to adapt or vary an amount of delay between each power stage to preserve steady stage operation across load, process, voltage, and temperature variations. The phase interleaving circuit 480 further includes a filter circuit (not shown) to filter a voltage or signal generated from the adaptive circuit. For example, the phase interleaving circuit 480 receives the first PWM pulse (PWM<1>) 404A to generate a second PWM pulse initiation signal (PWM_INT<2>) 456B.

Similar to circuit architecture 100B, circuit architecture 400 may include a current sense circuit ($A_{SENSE}$) to sense an inductor current $I_L$<1> Of the buck converter 410, during the PWM_N pulse 406A, whether the inductor current $I_L$<1> of the buck converter 410 has reached a predetermined inductor current $I_L$<1> (e.g., valley current). As noted above, the inductor current $I_L$<1> may have a triangular waveform during switching, as a result, containing a maximum value indicated by the peak and a minimum value indicated by the valley. During load insertion, if an output voltage decreases rapidly an output of the error amplifier increases in response to the rapidly decreasing output voltage. As such, the sensed current may intersect with the rising output of the error amplifier more quickly, thereby initiating the next PWM pulse much faster until the output voltage has reached steady-state.

The circuit architecture 400 may include the OTA 420 configured to receive, by the remote sense amplifier 425, a sensed voltage ($V_{REMOTE\_SENSE}$) of the buck converter 410 (e.g., the voltage at the load of the buck converter 410) and a reference voltage ($V_{DAC}$) to generate a compensating error voltage to adjust the sensed voltage $V_{REMOTE\_SENSE}$ towards the reference voltage $V_{DAC}$. Depending on the embodiment, the reference voltage $V_{DAC}$ may be predetermined or configurable. In some embodiments, the reference voltage $V_{DAC}$ may be ramped up to control adjustment of the sensed voltage $V_{REMOTE\_SENSE}$. To determine the sensed voltage $V_{REMOTE\_SENSE}$ from the buck converter 410, the circuit architecture 100A implements the remote sense amplifier 425 connected to the first and second feedback node (FB_P and FB_N) and outputs the sensed voltage $V_{REMOTE\_SENSE}$. The circuit architecture 400 may further include a type-II filter 422 controlled with bandwidth control signals that causes, during DCM operation, as noted above, the output of the OTA 420 (e.g., $V_{COMP}$) to rail out.

Accordingly, the lossy circuit 440 of the circuit architecture 400 is configured to prevent the output of the OTA 420 from railing out (e.g., the output voltage $V_{COMP}$ reaching a negative rail voltage). Thus, a shunt resistor ($R_{SHUNT}$) of the lossy circuit 440 is coupled in parallel with the type-II filter 422. Depending on the embodiment, the shunt resistor $R_{SHUNT}$ of the lossy circuit 440 may be a resistor in an order of magnitude lower than the output resistance ($R_{OUT}$) of the type-II filter 422 (e.g., two orders of magnitude lower). The lossy circuit 440 includes a third switch controlled by a signal that is triggered when the buck converter 410 is in the DCM. During the DCM, the offset buffer 445 is used to generate resistance in the shunt resistor $R_{SHUNT}$ of the lossy circuit 140. Depending on the embodiment, the offset buffer 445 may apply a voltage ripple ($V_{RIPPLE}$) generated by the ripple injector 424 into an offset buffer such that the output of the offset buffer is applied to the shunt resistor $R_{SHUNT}$ of the lossy circuit 440 to apply resistance to the output of the OTA 420 to prevent the output voltage $V_{COMP}$ from reaching a negative rail voltage. Accordingly, once the buck converter 410 is not in the DCM, the integrator 420 may operate normally without any additional influence on the output of the OTA 420. Other offset buffers are contemplated to assist in generating sufficient resistance to prevent the output voltage $V_{COMP}$ from reaching a negative rail voltage.

In some instances, during the DCM, the output of the OTA 420 may be far from the first feedback node (FB_P), which causes delayed reaction during load insertion (e.g., delays the first PWM pulse initiation signal (PWM_INT<1>) 456A to the first COT controller 160A). Inherently, the integrator 420 contains a certain level of DC gain to assist in the first PWM pulse initiation signal 456A at the PWM comparator. Accordingly, the circuit architecture 400 utilizes the feedforward circuit 450 to speed up the loop response by using a DDA-based PWM comparator 452 which receives the output of the OTA 420, the first feedback node (FB_P), a first and second output of a fully differential amplifier 454. The first and second output of the fully differential amplifier 454 is based on the reference voltage $V_{DAC}$ and the sensed voltage ($V_{REMOTE\_SENSE}$) of the buck converter 410. Thus, the fully differential amplifier 454 allows the first PWM pulse 404A to react much quicker to load insertion during the DCM operation of the buck converter 410 without interfering with the CCM operation of the buck converter 410.

The COT controller 460A of the circuit architecture 400 determines a constant time period in which to generate the first PWM pulse 404A. The constant time period is generated from the input voltage $V_{IN}$ and the voltage at the first feedback node FB_P. The first PWM pulse 404A is generated according to the first PWM pulse initiation signal 456A from the DDA-based PWM comparator 452 of the feedforward circuit 450. Once the first PWM pulse 404A is generated, the phase interleaving circuit 480 receives the first PWM pulse 404A to generate the second PWM pulse 404B.

The DCM signal generator 470A of the circuit architecture 400 determines whether a first power stage of the buck converter 410 is in the DCM or the CCM. In particular, based on the first PWM pulse 404A and an output of a first zero-cross-detector circuit (ZCD<1>) 472A (not shown), the DCM signal generator 470A may generate a first DCM signal 474A.

As a result of generating the first DCM signal 474A, the DCM signal generator 470A generates the first tri-state signal 408A and, in some instances, the bandwidth control to feed into the type-II filter 422. Accordingly, the first DCM signal 474A is interrelated with the first tri-state signal 408A. In particular, the DCM signal generator 470A generates the first DCM signal 474A by detecting whether the first inductor current $I_L$<1> has crossed the zero current more than a predetermined number of times ($N_{ZCD}$), consecutively. Once the buck converter 410 is in the DCM, if the first inductor current $I_L$<1> does not cross the zero current, the DCM signal generator 470A pulls the first DCM signal 474A low. In particular, a first phase inductor current of the multi-phase buck converter is being monitored for any zero crossing by the zero-cross-detector to apply resistance to the integrator's output voltage $V_{COMP}$ to prevent the integrator's output voltage $V_{COMP}$ from reaching a negative rail voltage. In accordance with a multi-phase buck converter, current feedback signal solely present in the first phase of the multi-phase buck converter, thereby resulting in the voltage feedback signal also being solely present in the first phase of the multi-phase buck converter 410. Thus, each of the remaining phases (e.g., $N_{PHASE}$ of the multi-phase buck converter) are generated, by the phase interleaving circuit (e.g., 480), based on the first phase PWM pulse.

Accordingly, the DCM signal generator 470B of the circuit architecture 400 determines whether a second power stage of the buck converter 410 is in the DCM or the CCM. The DCM signal generator 470B generates a second DCM signal 474B and a second tri-state signal 408C based on a result of the COT controller 460B of the circuit architecture 400. The COT controller 460B generates, similar to the COT controller 460A, a second PWM pulse 404B based on the second PWM pulse initiation signal 456B, which is received from the phase interleaving circuit 480 rather than from the DDA-based PWM comparator 452. Similar to the DCM signal generator 470A, the DCM signal generator 470B generates the second DCM signal 474B and the second tri-state signal 408C by detecting, via based on an output of a second zero-cross-detector circuit (ZCD<2>) 472B (not shown), the second inductor current $I_L$<2> crossing the zero current more than a predetermined number of times ($N_{ZCD}$), consecutively. Similar to the DCM signal generator 470A, the DCM signal generator 470B pulls the second DCM signal 474B low as a result of detecting, via based the output of the second zero-cross-detector circuit 472B (not shown), that the second inductor current $I_L$<2> does not cross the zero current during the DCM.

FIG. 5 is a flow diagram of an example method 500 to automatically operate the buck converter in DCM, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the circuit architecture 100A of FIG. 1A or the circuit architecture 100B of FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic determines whether a buck converter is operating in a continuous conduction mode (CCM) or a discontinuous conduction mode (DCM). The buck converter is configured to operate in the CCM and the DCM. Depending on the embodiment, the buck converter is one of: a single-phase buck converter (e.g., buck converter 110 of FIG. 1A and buck converter 110B of FIG. 1B) or a multi-phase buck converter (e.g., buck converter 310 of FIG. 3 and buck converter 410 of FIG. 4). As previously described, the buck converter is a circuit used to convert high voltage to low voltage.

At operation 520, responsive determining that the buck converter is operating in the DCM, the processing logic applies, by a shunt resistor, resistance to an output voltage of an integrator of the buck converter to maintain the output voltage of the integrator. To apply, via the shunt resistor, resistance to the output voltage of an integrator, the processing logic generates a DCM signal by detecting a predetermined number of instances an inductor current of the buck converter crosses zero, and activating a switch coupled between the shunt resistor and an offset buffer to apply the output of the offset buffer to the shunt resistor. As described previously, the DCM signal generator generates a DCM signal by detecting whether the load current has crossed a zero current more than a predetermined number of times ($N_{ZCD}$), consecutively.

As described previously, the shunt resistor includes a switch coupled between the shunt resistor and offset buffer controlled by the DCM signal. The switch is triggered when the buck converter is in the DCM. During the DCM, the offset buffer is used to provide voltage bias to the shunt resistor and to prevent the output voltage of the integrator from reaching a negative rail voltage (e.g., maintain the output voltage of the integrator).

In some embodiments, responsive determining that the buck converter is operating in the CCM, the processing logic discontinues resistance to the output voltage of the integrator of the buck converter. To discontinue resistance to the output voltage of the integrator of the buck converter, the processing logic discontinues the DCM signal by detecting, during the DCM, that an inductor current of the buck converter does not crosses zero, and deactivating a switch coupled between the shunt resistor and an offset buffer to disconnect the output of the offset buffer from the shunt resistor. As described previously, the DCM signal generator discontinues the DCM signal if the load current does not cross the zero current.

In some embodiments, the processing logic provides a proportional gain to the output voltage of the integrator and a ripple voltage of the buck converter to accelerate the initiation of a PWM pulse to the buck converter. Accordingly, the processing logic compares, by a PWM comparator, the output voltage of the integrator and the ripple voltage with the proportional gain and outputs, based on the comparing, a PWM pulse initiation signal. As described previously, during the CCM, the output voltage of the integrator may be far from the ripple voltage, which causes delayed reaction during load insertion. Accordingly, the feedforward controller speeds up the initiation of the PWM signal by using a differential difference amplifier to receive the output voltage, the ripple voltage, a first and second output of a fully differential amplifier based on the reference voltage and the sensed voltage of the buck converter. Thus, the fully differential amplifier allows the PWM pulse to react much quicker to load insertion during the DCM of the buck converter without interfering with the CCM of the buck converter.

Depending on the embodiment, the processing logic initiates, by a constant-on-time (COT) controller, a PWM pulse to the buck converter. As described previously, the COT controller determines a constant time period in which to generate the PWM pulse initiated by the PWM initiation signal.

FIG. 6 is a flow diagram of an example method 600 to automatically operate the buck converter in DCM, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the circuit architecture 100A of FIG. 1A or the circuit architecture 100B of FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic detects whether an inductor current of a constant-on-time (COT) buck converter crosses zero amps a predetermined number of instances, wherein the buck converter is configured to operate in a continuous conduction mode (CCM) and a discontinuous conduction mode (DCM). Depending on the embodiment, the buck converter is one of: a single-phase buck converter (e.g., buck converter 110 of FIG. 1A) or a multi-phase buck converter (e.g., buck converter 310 of FIG. 3). As previously described, the buck converter is a circuit used to convert high voltage to low voltage.

At operation 620, responsive to detecting that the inductor current of the COT buck converter crossed zero the predetermined number of instances, the processing logic generates a DCM signal to activate a switch coupled between a shunt resistor and an offset buffer. The DCM signal indicates that the buck converter is operating in the DCM. As described previously, the DCM signal generator generates a DCM signal by detecting whether the load current has crossed the zero current more than a predetermined number of times ($N_{ZCD}$), consecutively. As described previously, the shunt resistor includes a switch coupled between the shunt resistor and offset buffer controlled by the DCM signal. The switch is triggered when the buck converter is in the DCM.

At operation 630, the processing logic applies resistance, by the shunt resistor, to an output voltage of an integrator based on the offset buffer. As described previously, during the DCM, the offset buffer is used to provide voltage bias to in the shunt resistor to prevent the output voltage of the integrator from reaching a negative rail voltage (e.g., maintain the output voltage of the integrator).

In some embodiments, the processing logic detects whether the inductor current of the COT buck converter does not cross zero amps and discontinues the DCM signal to deactivate the switch coupled between the shunt resistor and the offset buffer, indicating that the buck converter is operating in the CCM. The resistance applied to the output voltage of the integrator based on the offset buffer is terminated. As described previously, the DCM signal generator discontinues the DCM signal if the load current does not cross the zero current.

In some embodiments, the processing logic provides a proportional gain to the output voltage of the integrator and a ripple voltage of the COT buck converter to accelerate the initiation of a pulse-width-modulation (PWM) pulse to the COT buck converter. Accordingly, the processing logic compares, by a PWM comparator, the output voltage of the integrator and the ripple voltage with the proportional gain and outputs, based on the comparing, an PWM pulse initiation signal. As described previously, during the DCM operation, the output voltage of the integrator may be far from the ripple voltage, which causes delayed reaction during load insertion. Accordingly, the feedforward controller speeds up the loop response by using a differential difference amplifier based PWM comparator to receive the integrator's output voltage $V_{COMP}$, the ripple voltage, a first and second output of a fully differential amplifier based on the reference voltage and the sensed voltage of the buck converter. Thus, the differential difference amplifier based comparator allows the PWM pulse to react much quicker to load insertion during the DCM operation of the buck converter without interfering with the CCM operation of the buck converter.

Depending on the embodiment, the processing logic, based on the PWM pulse initiation signal, initiates, by a COT controller of the COT buck controller, a PWM pulse to the buck converter. As described previously, the COT controller determines a constant time period in which to generate the PWM pulse initiated by the PWM initiation signal.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular implementations may vary from these exemplary details and still be contemplated to be within the scope of the present disclosure.

The description above includes specific terminology and drawing symbols to provide a thorough understanding of the present disclosure. In some instances, the terminology and symbols may imply specific details that are not required to practice the disclosure. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology, or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "de-asserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or de-asserts, if explicitly stated or indicated by context) the signal on a signal line coupled between the signal driving and signal receiving circuits. A signal line is said to be "activated" when a signal is asserted on the signal line, and "deactivated" when the signal is de-asserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement. While the disclosure has been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

While the disclosure has been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. An integrated circuit comprising:
a buck converter configured to operate in a continuous conduction mode (CCM) and a discontinuous conduction mode (DCM);
a DCM signal generator configured to generate a DCM signal based on detecting an inductor current of the buck converter crossing zero amps for a predetermined number of instances indicating that the buck converter is in the DCM;
an integrator configured to receive a detected voltage from across a load of the buck converter and a reference voltage and generate a compensating error voltage to adjust the detected voltage towards the reference voltage; and
a shunt resistor coupled to the integrator configured to prevent the compensating error voltage of the integrator during the DCM from reaching a negative voltage rail by applying resistance to the compensating error voltage of the integrator based on an offset buffer activated by the DCM signal of the DCM signal generator.

2. The integrated circuit of claim 1, wherein the buck converter is one of:
a single-phase buck converter or a multi-phase buck converter.

3. The integrated circuit of claim 1, wherein the DCM signal generator discontinues the DCM signal based on detecting, during the buck converter in the DCM, that the inductor current of the buck converter does not crosses zero amps.

4. The integrated circuit of claim 1, wherein the integrated circuit further comprises:
 a feedforward controller configured to generate a pulse-width-modulation (PWM) pulse initiation signal, during the CCM.

5. The integrated circuit of claim 4, wherein the integrated circuit further comprises:
 a constant-on-time (COT) controller coupled to the buck converter to initiate a PWM pulse based on the PWM pulse initiation signal.

6. The integrated circuit of claim 4, wherein the feedforward controller is a differential difference amplifier configured to generate the PWM pulse initiation signal, during the DCM, by providing a proportional gain to the compensating error voltage of the integrator and a ripple voltage of the buck converter.

7. A method comprising:
 determining whether a buck converter is operating in a continuous conduction mode (CCM) or a discontinuous conduction mode (DCM), wherein the buck converter is configured to operate in the CCM and the DCM;
 determining whether a DCM signal generated by a DCM signal generator based on detecting an inductor current of the buck converter crosses zero amps for a predetermined number of instances indicating that the buck converter is operating in the DCM; and
 responsive determining that the buck converter is operating in the DCM, applying, by a shunt resistor, resistance to a compensating error voltage of an integrator of the buck converter based on an offset buffer activated by the DCM signal of the DCM signal generate to prevent compensating error voltage of the integrator from reaching a negative voltage rail.

8. The method of claim 7, wherein the buck converter is one of: a single-phase buck converter or a multi-phase buck converter.

9. The method of claim 7, further comprising:
 responsive determining that the buck converter is operating in the CCM, discontinuing resistance to the compensating error voltage of the integrator of the buck converter.

10. The method of claim 9, wherein discontinuing resistance to the compensating error voltage of the integrator of the buck converter includes discontinuing the DCM signal by detecting, during the DCM, that an inductor current of the buck converter does not cross zero, and deactivating a switch coupled between the shunt resistor and an offset buffer to disconnect an output of the offset buffer from the shunt resistor.

11. The method of claim 7, further comprising:
 providing a proportional gain to the compensating error voltage of the integrator and a ripple voltage of the buck converter to generate a pulse-width-modulation (PWM) pulse initiation signal used to accelerate initiation of a PWM pulse to the buck converter;
 comparing, by a PWM comparator, the compensating error voltage of the integrator and the ripple voltage with the proportional gain; and
 outputting, based on the comparing, an PWM pulse initiation signal.

12. The method of claim 11, further comprising:
 initiating, by a constant-on-time (COT) controller, the PWM pulse to the buck converter based on the PWM pulse initiation signal.

13. A method comprising:
 detecting whether an inductor current of a constant-on-time (COT) buck converter crosses zero amps a predetermined number of instances, wherein the COT buck converter is configured to operate in a continuous conduction mode (CCM) and a discontinuous conduction mode (DCM);
 responsive to detecting that the inductor current of the COT buck converter crossed zero the predetermined number of instances, generating, by a DCM signal generator, a DCM signal to activate a switch coupled between a shunt resistor and an offset buffer, wherein the DCM signal indicates that the COT buck converter is operating in the DCM; and
 applying resistance to a compensating error voltage of an integrator based on the offset buffer activated by the DCM signal of the DCM signal generator to prevent the compensating error voltage from reaching a negative voltage rail.

14. The method of claim 13, further comprising:
 detecting whether the inductor current of the COT buck converter does not cross zero amps; and
 discontinuing the DCM signal to deactivate the switch coupled between the shunt resistor and the offset buffer, indicating that buck converter is operating in the CCM, wherein resistance applied to the compensating error voltage of the integrator, based on the offset buffer, is terminated.

15. The method of claim 13, wherein the COT buck converter is one of: a single-phase buck converter or a multi-phase buck converter.

16. The method of claim 13, further comprising:
 providing a proportional gain to the compensating error voltage of the integrator and a ripple voltage of the COT buck converter to generate a pulse-width-modulation (PWM) pulse initiation signal to accelerate initiation of a PWM pulse to the COT buck converter;
 comparing, by a PWM comparator, the compensating error voltage of the integrator and the ripple voltage with the proportional gain; and
 outputting, based on the comparing, an PWM pulse initiation signal.

17. The method of claim 16, further comprising:
 initiating, by a COT controller, a PWM pulse to the COT buck converter based on the PWM pulse initiation signal.

\* \* \* \* \*